United States Patent
Takagi

(10) Patent No.: US 9,470,142 B2
(45) Date of Patent: Oct. 18, 2016

(54) CONTROL APPARATUS FOR SUPERCHARGED INTERNAL COMBUSTION ENGINE

(71) Applicant: TOYOTA JIDOSHA KABUSHIKI KAISHA, Aichi-ken (JP)

(72) Inventor: Noboru Takagi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/568,190

(22) Filed: Dec. 12, 2014

(65) Prior Publication Data

US 2015/0096282 A1   Apr. 9, 2015

Related U.S. Application Data

(62) Division of application No. 13/881,084, filed as application No. PCT/JP2011/051212 on Jan. 24, 2011, now abandoned.

(51) Int. Cl.
*F02D 23/00* (2006.01)
*F02B 37/18* (2006.01)
*F02B 25/14* (2006.01)
(Continued)

(52) U.S. Cl.
CPC ........... *F02B 37/183* (2013.01); *F02B 25/145* (2013.01); *F02B 37/18* (2013.01); *F02D 13/0215* (2013.01); *F02D 13/0261* (2013.01); *F02D 23/00* (2013.01); *F02D 41/0007* (2013.01); *F02D 41/0065* (2013.01); *F02D 41/0235* (2013.01); *F02D 41/18* (2013.01);
(Continued)

(58) Field of Classification Search
CPC .... F02B 37/183; F02B 37/18; F02B 25/145; F02D 41/0065; F02D 13/0261; F02D 23/00; F02D 13/0215; F02D 41/0007; F02D 41/18
USPC ............... 60/697, 602; 123/90.15, 316, 348; 701/103; 702/182
See application file for complete search history.

(56) References Cited

U.S. PATENT DOCUMENTS 6,827,051 B2 * 12/2004 Kawasaki ................. F01L 9/04
                                                    123/568.14
6,904,356 B2 *  6/2005 Uchida ............... F02D 13/0219
                                                    123/568.14

(Continued)

FOREIGN PATENT DOCUMENTS

JP   04-132832 A   5/1992
JP   2002-266686 A   9/2002

(Continued)

*Primary Examiner* — Nicholas J Weiss
*Assistant Examiner* — Jason T Newton
(74) *Attorney, Agent, or Firm* — Sughrue Mion, PLLC

(57) ABSTRACT

Provided is a control apparatus for a supercharged internal combustion engine. A turbo supercharger, an exhaust bypass passage, a WGV capable of switching the opening and closing of the exhaust bypass passage, and variable valve operating mechanisms capable of changing a valve overlap period are included. The valve overlap period is shortened so that the fresh air blow-through amount Gsca becomes equal to or smaller than a predetermined blow-through determination value Gjudge when the blow-through amount Gsca is larger than the blow-through determination value Gjudge. The WGV is opened when the blow-through amount Gsca is still larger than the blow-through determination value Gjudge after the valve overlap period has been shortened.

2 Claims, 3 Drawing Sheets

(51) Int. Cl.
*F02D 13/02* (2006.01)
*F02D 41/00* (2006.01)
F02D 41/02 (2006.01)
F02D 41/18 (2006.01)

(52) U.S. Cl.
CPC ........ *F02D 2041/001* (2013.01); *Y02T 10/144* (2013.01); *Y02T 10/18* (2013.01)

(56) References Cited

U.S. PATENT DOCUMENTS

| | | | | |
|---|---|---|---|---|
| 6,917,874 B2* | 7/2005 | Uchida | ............... | F02D 13/0219 123/568.11 |
| 7,275,516 B1* | 10/2007 | Cunningham | ...... | F02D 13/0261 123/305 |
| 7,295,912 B2* | 11/2007 | Yasui | ........................ | F01L 1/08 123/90.15 |
| 7,440,836 B2* | 10/2008 | Yasui | ........................ | F01L 1/34 123/676 |
| 7,480,558 B2* | 1/2009 | Kang | .................... | F02D 35/023 123/295 |
| 2003/0168037 A1* | 9/2003 | zur Loye | .................. | F02B 1/12 123/295 |
| 2005/0251317 A1* | 11/2005 | Tanaka | ...................... | F01L 1/34 701/102 |
| 2008/0077304 A1* | 3/2008 | Suzuki | .................. | F02B 37/013 701/102 |
| 2009/0007564 A1* | 1/2009 | Suzuki | .................... | F02B 37/18 60/602 |
| 2010/0312451 A1* | 12/2010 | Karnik | ...................... | F01N 3/10 701/102 |
| 2011/0000448 A1* | 1/2011 | Buckland | ............. | F02B 37/007 123/90.15 |
| 2013/0255631 A1* | 10/2013 | Ruhland | ................. | F02D 41/30 123/445 |

FOREIGN PATENT DOCUMENTS

| | | |
|---|---|---|
| JP | 2007-263083 A | 10/2007 |
| JP | 2008-075549 A | 4/2008 |
| JP | 2008-175201 A | 7/2008 |
| JP | 2008-297930 A | 12/2008 |
| JP | 2010-163915 A | 7/2010 |

* cited by examiner

CONTROL APPARATUS FOR SUPERCHARGED INTERNAL COMBUSTION ENGINE

This application is a Divisional of application Ser. No. 13/881,084 filed Apr. 23, 2013, which is a National Stage of International Application No. PCT/JP2011/051212, filed on Jan. 24, 2011, the contents of all of which are incorporated herein by reference in their entirety.

TECHNICAL FIELD

The present invention relates to a control apparatus for a supercharged internal combustion engine, and more particular to a control apparatus for a supercharged internal combustion engine that is suitable for controlling the internal combustion engine that includes a variable valve operating mechanism capable of changing a valve overlap period and a waste gate valve.

BACKGROUND ART

So far, for example, Patent Document 1 discloses a control apparatus for an internal combustion engine. This conventional control apparatus estimates a blow-through amount of fresh air that blows through a combustion chamber from an intake passage to an exhaust passage, on the basis of the concentration of oxygen in the exhaust passage detected by an air fuel ratio sensor. On that basis, a valve overlap period is controlled in accordance with this amount of blow-through of the fresh air.

Including the above described document, the applicant is aware of the following documents as related art of the present invention.

CITATION LIST

Patent Documents

Patent Document 1: Japanese Laid-open Patent Application Publication No. 2007-263083
Patent Document 2: Japanese Laid-open Patent Application Publication No. 2008-175201
Patent Document 3: Japanese Laid-open Patent Application Publication No. 2010-163915
Patent Document 4: Japanese Laid-open Patent Application Publication No. 2008-297930

SUMMARY OF INVENTION

Technical Problem

If the blow-through amount of fresh air that blows through the combustion chamber from the intake passage to the exhaust passage becomes too large, there is a concern that a catalyst disposed in the exhaust passage may be overheated. According to the aforementioned conventional control apparatus, when the blow-through amount of the fresh air is large, shortening the valve overlap period allows the blow-through amount to be reduced. However, an operating region is present in which reducing the blow-through amount to a desirable amount is difficult only by adjusting the valve overlap period. In such an operating region, it is not possible to adequately reduce the blow-through amount only by shortening the valve overlap period, and as a result, there is a concern that the overheat of the catalyst may be produced.

The present invention has been made to solve the problem as described above, and has its object to provide a control apparatus for a supercharged internal combustion engine, which can favorably achieve a good balance between prevention of overheat of a catalyst disposed an exhaust passage and suppression of turbo lag, in a case in which a blow-through of fresh air that blows through a combustion chamber from an intake passage to an exhaust passage is generated.

Solution to Problem

A first aspect of the present invention is a control apparatus for a supercharged internal combustion engine, comprising:
a turbo supercharger which includes, in an exhaust passage, a turbine that is operated by exhaust energy;
an exhaust bypass passage which branches off from the exhaust passage at an upstream side portion of the turbine and merges with the exhaust passage at a downstream side portion of the turbine;
a waste gate valve which is capable of switching an opening and closing of the exhaust bypass passage;
a variable valve operating mechanism which is capable of changing a valve overlap period during which an opening period of an exhaust valve overlaps with an opening period of an intake valve;
blow-through amount obtaining means for obtaining a blow-through amount of fresh air that blows through a combustion chamber from an intake passage to the exhaust passage;
overlap period shortening means for shortening the valve overlap period so that the blow-through amount becomes equal to or smaller than a predetermined blow-through determination value when the blow-through amount is larger than the blow-through determination value;
blow-through amount determination means for determining whether or not the blow-through amount is still larger than the blow-through determination value after the valve overlap period has been shortened by the overlap period shortening means; and
WGV control means for opening the waste gate valve when the blow-through amount is determined by the blow-through amount determination means to be still larger than the blow-through determination value.

A second aspect of the present invention is the control apparatus for a supercharged internal combustion engine according to the first aspect of the present invention, further comprising an air fuel ratio sensor which is disposed in the exhaust passage to detect an air fuel ratio of exhaust gas,
wherein the blow-through amount obtaining means is means for obtaining the blow-through amount based on an output value of the air fuel ratio sensor.

Advantageous Effects of Invention

According to the first aspect of the present invention, when the blow-through amount of fresh air is larger than the blow-through determination value, it becomes possible to decrease the blow-through amount to the blow-through determination value or less, while suppressing the control amount of the opening degree of the waste gate valve to the minimum necessary. Therefore, the present invention can favorably achieve a good balance between prevention of overheat of a catalyst disposed an exhaust passage by controlling the blow-through amount and suppression of turbo lag, in a case in which the blow-through amount is larger than the blow-through amount.

When the blow-through amount is larger than the blow-through determination value, the second aspect of the present invention can favorably achieve a good balance between the prevention of overheat of the catalyst by controlling the blow-through amount and the suppression of turbo lag, by use of the configuration by which the aforementioned blow-through amount is obtained on the basis of the output value of the air fuel ratio sensor.

DESCRIPTION OF EMBODIMENT

First Embodiment

Description of System Configuration

Figure 1:
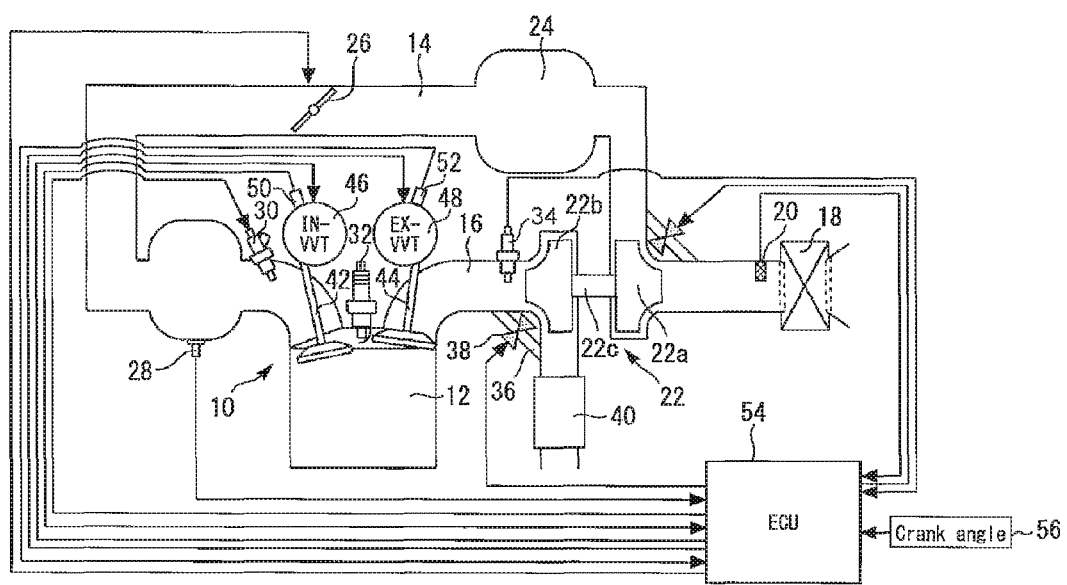
FIG. 1 is a schematic diagram for illustrating a system configuration of an internal combustion engine according to a first embodiment of the present invention.

FIG. 1 is a schematic diagram for illustrating a system configuration of an internal combustion engine 10 according to a first embodiment of the present invention. The system of the present embodiment includes, as one example, a spark ignition type internal combustion engine (gasoline engine) 10. A combustion chamber 12 is formed in each cylinder of the internal combustion engine 10. An intake passage 14 and an exhaust passage 16 are in communication with the combustion chamber 12.

An air cleaner 18 is disposed at a position near an inlet of the intake passage 14. An air flow meter 20 is disposed near a downstream position of the air cleaner 18 to output a signal according to a flow rate of air drawn into the intake passage 14. A compressor 22a of a turbo supercharger 22 is disposed downstream of the air flow meter 20. The compressor 22a is integrally connected, via a turbine shaft 22c, to a turbine 22b disposed at the exhaust passage 16.

An intercooler 24 that cools compressed air is disposed downstream of the compressor 22a. An electronically controlled throttle valve 26 is disposed downstream of the intercooler 24. An intake pressure sensor 28 for detecting an intake pressure P1 is disposed downstream of the throttle valve 26 (at an intake manifold part). In addition, each cylinder of the internal combustion engine 10 includes a fuel injection valve 30 for injecting fuel into an intake port, and an ignition plug 32 for igniting a mixture gas.

Further, an air fuel ratio sensor 34 for detecting an air fuel ratio (oxygen concentration) of exhaust gas is disposed on the upstream side of the turbine 22b in the exhaust passage 16. Furthermore, there is connected in the exhaust passage 16, an exhaust bypass passage 36 which is configured to branch off the exhaust passage 16 at an upstream side portion of the turbine 22b and merge with the exhaust passage 16 at a downstream side portion of the turbine 22b. At some point of the exhaust bypass passage 36, a waste gate valve (WGV) 38 is provided for opening and closing the exhaust bypass passage 36. The WGV 38 is herein assumed to be configured to be able to be adjusted to an arbitrary opening degree by means of a pressure regulated or electrically-operated type actuator (not shown). In addition, a catalyst 40 for purifying the exhaust gas is disposed in the exhaust passage 16 on the further downstream side of its portion that is connected with the exhaust bypass passage 36 on the downstream side of the turbine 22b.

An intake valve 42 and an exhaust valve 44 are provided at the intake port and an exhaust port, respectively. The intake valve 42 establishes continuity or discontinuity between the combustion chamber 12 and the intake passage 14, and the exhaust valve 44 establishes continuity or discontinuity between the combustion chamber 12 and the exhaust passage 16. The intake valve 42 and the exhaust valve 44 are driven by an intake variable valve operating mechanism 46 and an exhaust variable valve operating mechanism 48, respectively. It is assumed herein that as the intake variable valve operating mechanism 46, a variable valve timing (VVT) mechanism is used that continuously makes the opening and closing timing of the intake valve 42 variable by changing a rotation phase of an intake camshaft with respect to a rotation phase of a crankshaft, and the exhaust variable valve operating mechanism 48 also is a mechanism that has the same configuration as that. In addition, in the vicinity of the intake camshaft and an exhaust camshaft, an intake cam angle sensor 50 and an exhaust cam angle sensor 52 are disposed for detecting rotational angles of the camshafts, that is, an intake cam angle and an exhaust cam angle, respectively.

Furthermore, the system shown in FIG. 1 includes an ECU (Electronic Control Unit) 54. An input section of the ECU 54 is connected with various types of sensors for detecting the operating state of the internal combustion engine 10, such as a crank angle sensor 56 for detecting an engine speed, as well as the air flow meter 20, the intake pressure sensor 28 and the air fuel ratio sensor 34 that are described above. In addition, an output section of the ECU 54 is connected with various types of actuators for controlling the operating state of the internal combustion engine 10, such as the throttle valve 26, the fuel injection valve 30, the ignition plug 32, the WGV 38 and the variable valve operating mechanisms 46 and 48 that are described above. The ECU 54 can control the operating state of the internal combustion engine 10 by actuating each actuator according to the output of the aforementioned each sensor and predetermined programs.

Characteristic Control According to First Embodiment

Figure 2:
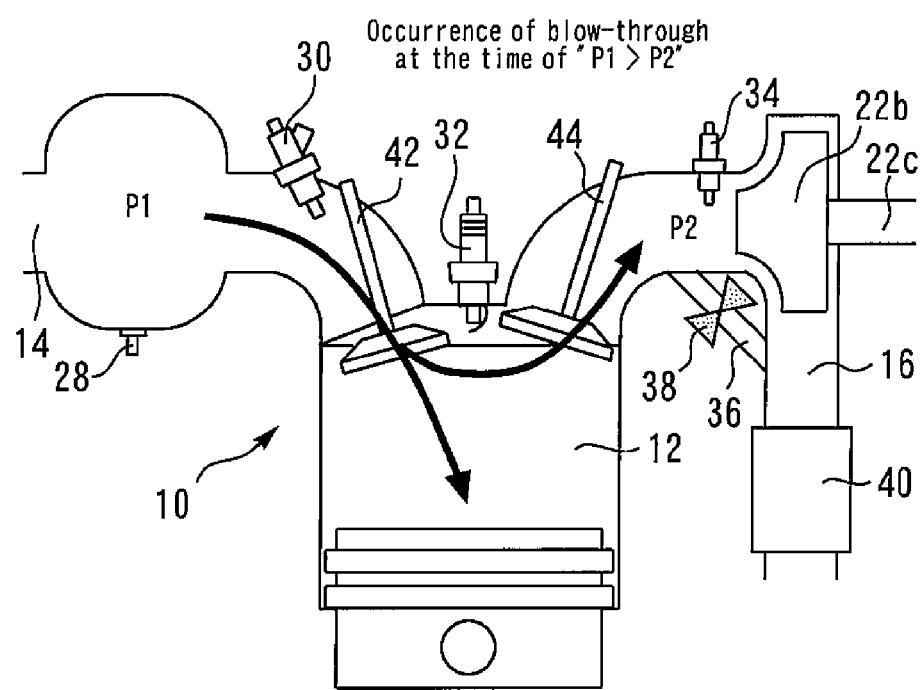
FIG. 2 is a diagram for explaining a blow-through of fresh air that blows through a combustion chamber from an intake passage to an exhaust passage.

FIG. 2 is a diagram for explaining a blow-through of fresh air that blows through the combustion chamber 12 from the intake passage 14 to the exhaust passage 16.

According to the intake variable valve operating mechanism 46 and the exhaust variable valve operating mechanism 48 that are described above, a valve overlap period during which the opening period of the exhaust valve 44 and the opening period of the intake valve 42 are overlapped with each other (hereinafter, simply referred to as the "valve overlap period") can be changed by adjusting at least one of the advance amount of the opening and closing timing of the intake valve 42 and the retard amount of the opening and closing timing of the exhaust valve 44.

When the supercharging by the turbo supercharger 22 allows an intake pressure P1 to be higher than an exhaust pressure P2 in a state in which the aforementioned valve overlap period is set, as shown in FIG. 2, the phenomenon is produced in which fresh air (intake air) blows through the combustion chamber 12 from the intake passage 14 toward the exhaust passage 16. If such blow-through of the fresh air is produced, the residual gas in the cylinder can be scavenged, and therefore, effects such as improvement of the torque of the internal combustion engine 10 and the like can be obtained.

However, if the amount of the blow-through of fresh air that is to be expelled to the exhaust passage 16 without contributing to the combustion becomes too large, there is a concern that the overheat of the catalyst 40 due to the combustion at the exhaust passage 16 and the deterioration of fuel efficiency of the internal combustion engine 10 may be produced. When the amount of the blow-through of fresh air is large as seen above, shortening the valve overlap period by means of the variable valve operating mechanisms 46 and 48 allows the amount of the blow-through to be reduced. However, an operating region is present in which reducing the amount of the blow-through to a desirable amount is difficult only by adjusting the valve overlap period. In such an operating region, it is not possible to adequately reduce the amount of blow-through only by shortening the valve overlap period, and as a result, there is a concern that the overheat of the catalyst may be produced.

Accordingly, in the present embodiment, a fresh air blow-through amount Gsca is calculated by use of the output value of the air fuel ratio sensor 34 during operation of the internal combustion engine 10, and further, when the blow-through amount Gsca calculated is larger than a predetermined blow-through determination value Gjudge, the valve overlap period is shortened so that the blow-through amount Gsca becomes smaller than or equal to the blow-through determination value Gjudge. On that basis, if the blow-through amount Gsca has not yet become smaller than or equal to the blow-through determination value Gjudge in spite of the shortening of the valve overlap period, the WGV 38 is opened.

Figure 3:
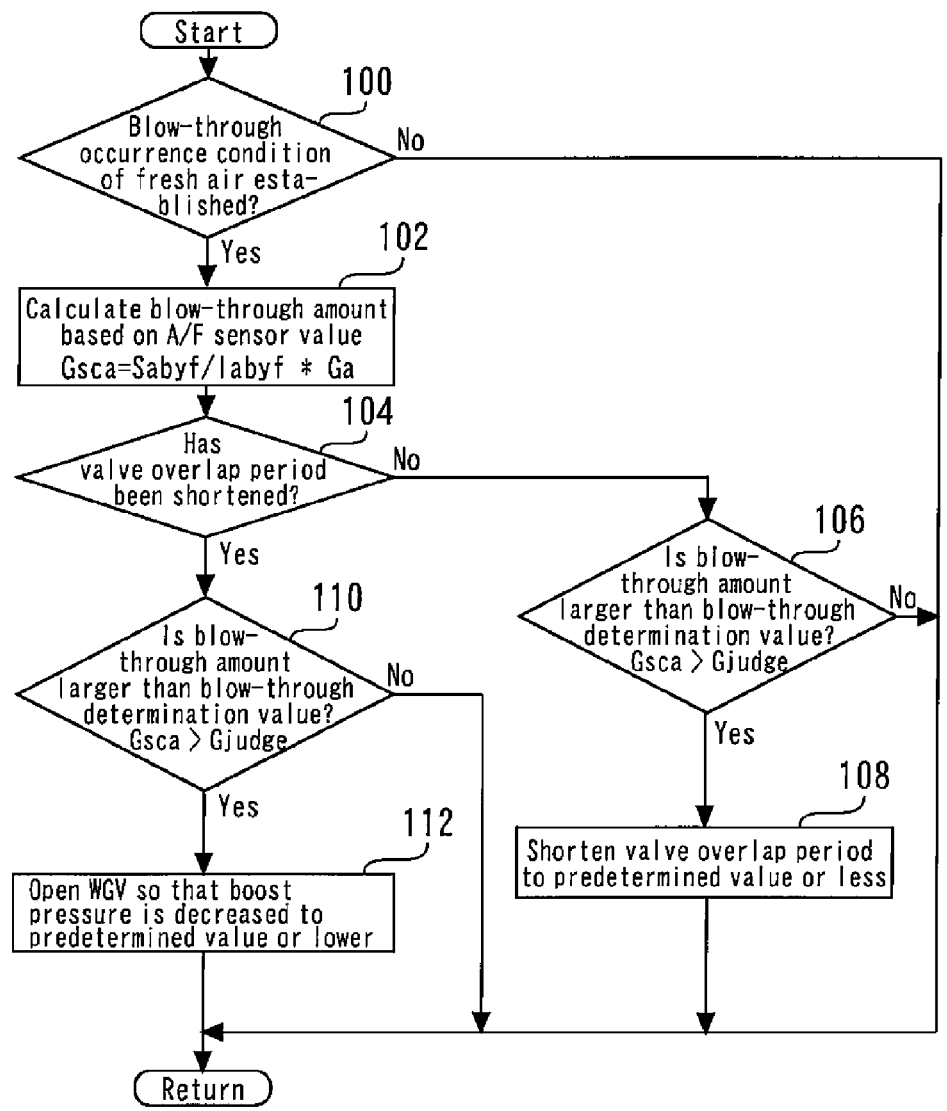
FIG. 3 is a flowchart of a routine that is executed in the first embodiment of the present invention.

FIG. 3 is a flowchart showing a control routine executed by the ECU 54 to implement the control according to the first embodiment of the present invention.

According to the routine shown in FIG. 3, first, it is determined whether or not a blow-through occurrence condition of fresh air is established (step 100). Specifically, the ECU 54 stores a map (not shown) that defines an operating region in which the blow-through occurrence condition under which the blow-through of fresh air is generated during setting of the valve overlap period is established, through the use of the operating region (region based on a load factor and an engine speed) of the internal combustion engine 10. In present step 100, it is determined with reference to such a map whether or not the current operating region is an operating region in which the blow-through occurrence condition is established. In this connection, determination as to whether or not the blow-through occurrence condition is established is not limited to the one using the aforementioned method, and if, for example, an exhaust pressure sensor for detecting the exhaust pressure P2 is included in addition to the intake pressure sensor 28 for detecting the intake pressure P1, may be the one performed by comparing values of those sensors.

If it is determined in aforementioned step 100 that the blow-through occurrence condition of fresh air is established, the fresh air blow-through amount Gsca is calculated on the basis of the output value of the air fuel ratio sensor 34 (step 102). In present step 102, the blow-through amount Gsca is calculated in accordance with the following expression.

$$Gsca = Sabyf / Iabyf \times Ga$$

where Sabyf denotes an air fuel ratio of exhaust gas obtained by use of the air fuel ratio sensor 34, Iabyf denotes a target air fuel ratio calculated on the basis of the intake air amount and the fuel injection amount, and Ga denotes an intake air amount obtained by use of the air flow meter 20.

Next, it is determined whether or not the valve overlap period has been shortened (step 104). Specifically, in present step 104, it is determined whether or not there is a situation in which the valve overlap period has been shortened to a predetermined value or less by means of the processing of step 108 described later, during establishment of the aforementioned blow-through occurrence condition.

If the valve overlap period is determined in aforementioned step 104 not to have been shortened, it is determined whether or not the fresh air blow-through amount Gsca is larger than a predetermined determination value Gjudge (step 106). The determination value Gjudge in present step 106 is a value that is set in advance as a threshold value for judging whether or not the current blow-through amount Gsca is an amount by which the overheat of the catalyst 40 may be produced.

If it is determined in aforementioned step 106 that the current blow-through amount Gsca is larger than the determination value Gjudge, the valve overlap period is shortened by means of the variable valve operating mechanisms 46 and 48 so as to be shorter than or equal to a predetermined value (step 108).

If, on the other hand, the valve overlap period is determined in aforementioned step 104 to have been shortened, it is then determined whether or not the current blow-through amount Gsca is larger than the determination value Gjudge by the processing similar to that of aforementioned step 106 (step 110). As a result of this, if the current blow-through amount Gsca is determined in present step 110 to be larger than the determination value Gjudge, that is to say, it can be judged that the blow-through amount Gsca has not yet become smaller than or equal to the blow-through determination value Gjudge in spite of the shortening of the valve overlap period, the WGV 38 is opened to an opening degree necessary to decrease the boost pressure to a predetermined pressure or lower (step 112). As one example, the processing of present step 112 can be performed as follows. More specifically, for example, a feedback control of the WGV opening degree is performed so as to achieve the value of the boost pressure (obtained by a map or the like) necessary for the blow-through amount Gsca to be smaller than or equal to the blow-through determination value Gjudge, on the basis of the intake pressure P1 detected by the intake pressure sensor 28.

According to the routine shown in FIG. 3 described so far, if the blow-through amount Gsca is still not smaller than or equal to the blow-through determination value Gjudge after the shortening of the valve overlap period has been performed, the WGV 38 is opened in order to decrease the boost pressure. In other words, according to the aforementioned routine, under a situation in which the blow-through amount Gsca becomes larger than the blow-through determination value Gjudge, a control to reduce the blow-through amount Gsca is performed in the order from the shortening of the valve overlap period to the adjustment of the WGV 38. More specifically, opening the WGV 38 for the purpose of reducing the blow-through amount is prohibited until it is judged that shortening the valve overlap period does not allow the blow-through amount Gsca to be smaller than or equal to the blow-through determination value Gjudge.

If, in contrast to the aforementioned routine, the WGV 38 is opened immediately when the blow-through amount Gsca becomes larger than the blow-through determination value Gjudge, the control amount of the opening degree of the WGV 38 that is necessary for the blow-through amount Gsca to be smaller than or equal to the blow-through determination value Gjudge becomes large. As a result of this, turbo lag becomes large due to a decrease in the flow rate of exhaust gas passing through the turbine 22b. On the other hand, according to the method of the aforementioned routine, when the blow-through amount Gsca is required to be suppressed by the WGV 38, it becomes possible to suppress the control amount of the opening degree of the WGV 38 to the minimum necessary. Therefore, the system according to the present embodiment can favorably achieve a good balance between prevention of overheat of the catalyst 40 by suppressing the blow-through amount Gsca and suppression of turbo lag, while obtaining the scavenging effect, in a case in which the blow-through amount Gsca is larger than the blow-through determination value Gjudge.

Incidentally, in the first embodiment, which has been described above, the blow-through amount of fresh air is calculated by use of the output value of the air fuel ratio sensor 34. However, the blow-through amount obtaining means of the present invention is not limited to the one using the aforementioned method.

In addition, in the first embodiment, which has been described above, the valve overlap period is changed by means of the intake variable valve operating mechanism 46 that is capable of changing the opening and closing timing of the intake valve 42 and the exhaust variable valve operating mechanism 48 that is capable of changing the opening and closing timing of the exhaust valve 44. However, the variable valve operating mechanism of the present invention is not limited to the one having the aforementioned configuration. More specifically, a configuration may be adopted that adjusts the valve overlap period by regulating at least one of the closing timing of the exhaust valve and the opening timing of the intake valve.

It is noted that in the first embodiment, which has been described above, the ECU 54 executes the aforementioned processing of step 102, whereby the "blow-through amount obtaining means" according to the first aspect of the present invention is realized, the ECU 54 executes the aforementioned processing of step 108 when the aforementioned determination of step 106 is positive, whereby the "overlap period shortening means" according to the first aspect of the present invention is realized, the ECU 54 executes the aforementioned processing of step 110 when the aforementioned determination of step 104 is positive, whereby the "blow-through amount determination means" according to the first aspect of the present invention is realized, and the ECU 54 executes the aforementioned processing of step 112 when the aforementioned determination of step 110 is positive, whereby the "WGV control means" according to the first aspect of the present invention is realized.

DESCRIPTION OF SYMBOLS

10 internal combustion engine
12 combustion chamber
14 intake passage
16 exhaust passage
20 air flow meter
22 turbo supercharger
22a compressor
22b turbine
22c turbine shaft
26 throttle valve
28 intake pressure sensor
30 fuel injection valve
32 ignition plug
34 air fuel ratio sensor
36 exhaust bypass passage
38 waste gate valve
40 catalyst
42 intake valve
44 exhaust valve
46 intake variable valve operating mechanism
48 exhaust variable valve operating mechanism
50 intake cam angle sensor
52 exhaust cam angle sensor
54 ECU (Electronic Control Unit)

The invention claimed is:

1. A control method for a supercharged internal combustion engine, including a turbo supercharger which includes, in an exhaust passage, a turbine that is operated by exhaust energy; an exhaust bypass passage which branches off from the exhaust passage at an upstream side portion of the turbine and merges with the exhaust passage at a downstream side portion of the turbine; a waste gate valve which is capable of switching an opening and closing of the exhaust bypass passage; and one or both of an intake variable valve operating mechanism and an exhaust variable valve operating mechanism, and a controller, the method comprising:
    obtaining by the controller a blow-through amount of fresh air that blows through a combustion chamber from an intake passage to the exhaust passage;
    shortening by the controller a valve overlap period during which an opening period of an exhaust valve overlaps with an opening period of an intake valve so that the blow-through amount becomes equal to or smaller than a predetermined blow-through determination value when the blow-through amount is larger than the blow-through determination value;
    determining by the controller whether or not the blow-through amount is still larger than the blow-through determination value after shortening the valve overlap period; and
    opening the waste gate valve based on a determination that the blow-through amount is still larger than the blow-through determination value after the shortening of the valve overlap period, while prohibiting the waste gate valve from being opened for decreasing the blow-through amount until determining the blow-through amount to be still larger than the blow-through determination value after the shortening of the valve overlap period.

2. The control method for a supercharged internal combustion engine according to claim 1, further comprising
    obtaining the blow-through amount based on an output value of an air fuel ratio sensor which is disposed in the exhaust passage to detect an air fuel ratio of exhaust gas.

* * * * *